J. E. HAWKINS.
Velocipede.
No. 86,153. Patented Jan. 26, 1869.
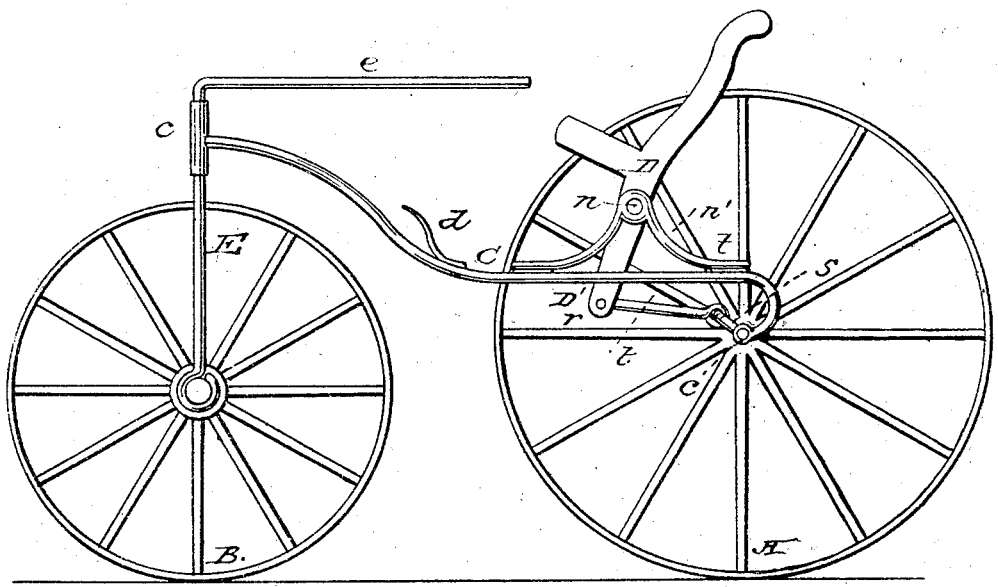

JOHN E. HAWKINS, OF LANSINGBURG, NEW YORK.

*Letters Patent No. 86,153, dated January 26, 1869.*

---

IMPROVEMENT IN VELOCIPEDES.

---

The Schedule referred to in these Letters Patent and making part of the same.

---

*To all whom it may concern:*

Be it known that I, JOHN E. HAWKINS, of Lansingburg, in the county of Rensselaer, and State of New York, have invented a new and useful Improvement in Velocipedes; and I do hereby declare that the following is a full, clear, and exact description thereof, reference being had to the accompanying drawings, and the letters of reference marked thereon.

My invention relates to a vehicle running upon three wheels, one in front and two in the rear, and which is propelled by the power of the person riding thereon.

The accompanying drawing represents a side elevation of the vehicle, with the near hind wheel removed.

A is the off rear wheel, and

B, the single front wheel.

C is the iron frame which couples the front and rear wheels together, and also supports the rider.

D is a rocking-chair, in which the rider sits, mounted on said coupling-frame.

Said frame consists of two opposite side-rods, precisely alike, the rear ends of which are bent down over the axle, as shown in the drawings, each terminating in a sleeve, c, and these sleeves embracing the axle far enough apart to admit the chair D between said side-rods, and the front ends of said side-rods being so bent as to meet in front of the cross foot-rest d, and connect with the vertical hub or sleeve c', over the front wheel.

The front wheel is embraced by a forked pivot-standard, E, rising vertically from its axis, which has its bearings in the lower ends of the opposite legs of said standard, and just above the top of the wheel said legs unite, forming a single round shaft, which passes through the vertical hub or sleeve c', and thence bends back toward the seat D, forming the handle e, by which the rider guides the vehicle.

The chair D rocks on a shaft, n, which has its bearings in brace-standards n', mounted, one on each of the opposite side-rods of the coupling-frame C.

The two legs, D', projecting downward from opposite sides of the chair, thus become vibrating levers, turning upon the shaft n, and the lower ends of said levers are connected by a cross-rod, r.

In the centre of the rear axle is a crank, s, which is connected with the centre of the cross-rod r by a connecting-rod, t. The wheels are attached firmly to their axles, which rotate with them.

It will be seen that by oscillating the chair D upon its rock-shaft n, the vibrating levers D', by means of cross-bar r and connecting-rod t, will turn the crank s, thus rotating the rear wheels, and propelling the vehicle.

The rider sits in the chair D, with his feet upon the cross-rest d, and, by swaying his body to and fro, propels the vehicle forward, with little more muscular exertion than is necessary to keep an ordinary rocking-chair in motion. By means of the handle e he can turn the front wheel laterally to the right or left, at pleasure, and thus guide the course of the vehicle.

What I claim as my invention, and desire to secure by Letters Patent, is—

In combination with the two driving-wheels, single guide-wheel, and coupling-frame, the chair D, mounted on rock-shaft n, with projecting legs or levers D', connecting-rod t, and crank s, on the axle of the driving-wheels, all constructed, arranged, and operating substantially as described.

JOHN E. HAWKINS.

Witnesses:
J. R. STEVENS,
J. N. ADAMS.